US012779918B2

(12) United States Patent
Kimura

(10) Patent No.: US 12,779,918 B2
(45) Date of Patent: Nov. 3, 2026

(54) VEHICLE

(71) Applicant: SUBARU CORPORATION, Tokyo (JP)

(72) Inventor: Ryotaro Kimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 153 days.

(21) Appl. No.: 19/037,387

(22) Filed: Jan. 27, 2025

(65) Prior Publication Data

US 2025/0303805 A1 Oct. 2, 2025

(30) Foreign Application Priority Data

Mar. 27, 2024 (JP) ................................ 2024-051900

(51) Int. Cl.
*B60D 1/36* (2006.01)
*B60W 30/18* (2012.01)

(52) U.S. Cl.
CPC ......... *B60D 1/36* (2013.01); *B60W 30/18009* (2013.01)

(58) Field of Classification Search
CPC ... B60D 1/36; B60D 1/06; B60D 1/62; B60D 1/00; B60D 1/58; B60W 30/18009; B60R 16/0232
See application file for complete search history.

(56) References Cited

U.S. PATENT DOCUMENTS

| | | | | |
|---|---|---|---|---|
| 2009/0078521 | A1 | 3/2009 | Ohtomo | |
| 2019/0329612 | A1* | 10/2019 | Gaufin | B60D 1/28 |
| 2021/0053407 | A1* | 2/2021 | Smith | B25J 19/021 |
| 2025/0018755 | A1* | 1/2025 | Ricke | B60D 1/02 |
| 2026/0091673 | A1* | 4/2026 | Gustafson | B60K 35/28 |
| 2026/0188054 | A1* | 7/2026 | Schneider | G07C 5/006 |

FOREIGN PATENT DOCUMENTS

| | | | | |
|---|---|---|---|---|
| JP | 2009-73363 | A | 4/2009 | |
| WO | WO-2021052570 | A1 * | 3/2021 | B62D 53/08 |
| WO | WO-2022051329 | A1 * | 3/2022 | B62D 53/08 |

* cited by examiner

*Primary Examiner* — Drew J Brown
(74) *Attorney, Agent, or Firm* — Rimon P.C.

(57) ABSTRACT

A vehicle includes a vehicle body, a coupling device, a vibration generator, a sensor, and a controller. The coupling device is configured to couple a towed object and the vehicle body to each other. The vibration generator is provided on the vehicle body and configured to vibrate the vehicle body. The sensor is provided on the vehicle body and configured to measure the vibration of the vehicle body. The controller is configured to control the vibration generator. The controller includes one or more processors and one or more memories coupled to the one or more processors. The one or more processors are configured to execute processing including: causing the vibration generator to generate a first vibration; measuring a second vibration characteristic; and comparing the first vibration characteristic and the second vibration characteristic to determine a coupling state between the vehicle body and the towed object.

8 Claims, 6 Drawing Sheets

VEHICLE

CROSS-REFERENCE TO RELATED APPLICATIONS

The present application claims priority from Japanese Patent Application No. 2024-051900 filed on Mar. 27, 2024, the entire contents of which are hereby incorporated by reference.

BACKGROUND

The disclosure relates to a vehicle.

When a conventional vehicle malfunctions, the vehicle may not be able to travel by itself due to the malfunction. For example, Japanese Unexamined Patent Application Publication (JP-A) No. 2009-73363 discloses a vehicle towing device capable of safely towing a vehicle when the vehicle cannot travel by itself.

The towing device disclosed therein includes a coupler that couples a towing vehicle and a towed vehicle. The coupler is provided with a tension detector. When the tension applied to the coupler is greater than or equal to a predetermined value, the towing device informs a display panel, serving as a notification unit, of a tension abnormality. In this way, when an excessive towing load is applied to the towing vehicle during towing, a driver who drives the vehicle is informed of the tension abnormality, and inappropriate towing is prevented.

SUMMARY

An aspect of the disclosure provides a vehicle. The vehicle includes a vehicle body, a coupling device, a vibration generator, a sensor, and a controller. The coupling device is configured to couple a towed object and the vehicle body to each other. The vibration generator is provided on the vehicle body and configured to vibrate the vehicle body. The sensor is provided on the vehicle body and configured to measure the vibration of the vehicle body. The controller is configured to control the vibration generator. The controller includes one or more processors and one or more memories coupled to the one or more processors. The one or more processors are configured to execute processing including: causing the vibration generator to generate a first vibration having a first vibration characteristic set in advance, in a state in which the vehicle body and the towed object are coupled to each other by the coupling device; measuring, using the sensor, a second vibration characteristic that is a characteristic of a second vibration actually generated in the vehicle body coupled to the towed object; and comparing the first vibration characteristic and the second vibration characteristic to determine a coupling state between the vehicle body and the towed object.

BRIEF DESCRIPTION OF THE DRAWINGS

The accompanying drawings are included to provide a further understanding of the disclosure and are incorporated in and constitute a part of this specification. The drawings illustrate an embodiments and, together with the specification, serve to describe the principles of the disclosure.

DETAILED DESCRIPTION

When a vehicle and a towed object are not appropriately coupled to each other by a coupling device, the vehicle and the towed object may be uncoupled while the vehicle is towing the towed object. Hence, a driver of the vehicle checks whether the vehicle and the towed object are appropriately coupled by the coupling device visually or manually by rocking the coupling device. This checking task is troublesome for the driver, and it is not easy to determine whether the vehicle and the towed object are appropriately coupled.

It is desirable to provide a vehicle with which it is easy to determine whether the vehicle and a towed object are appropriately coupled by a coupling device.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
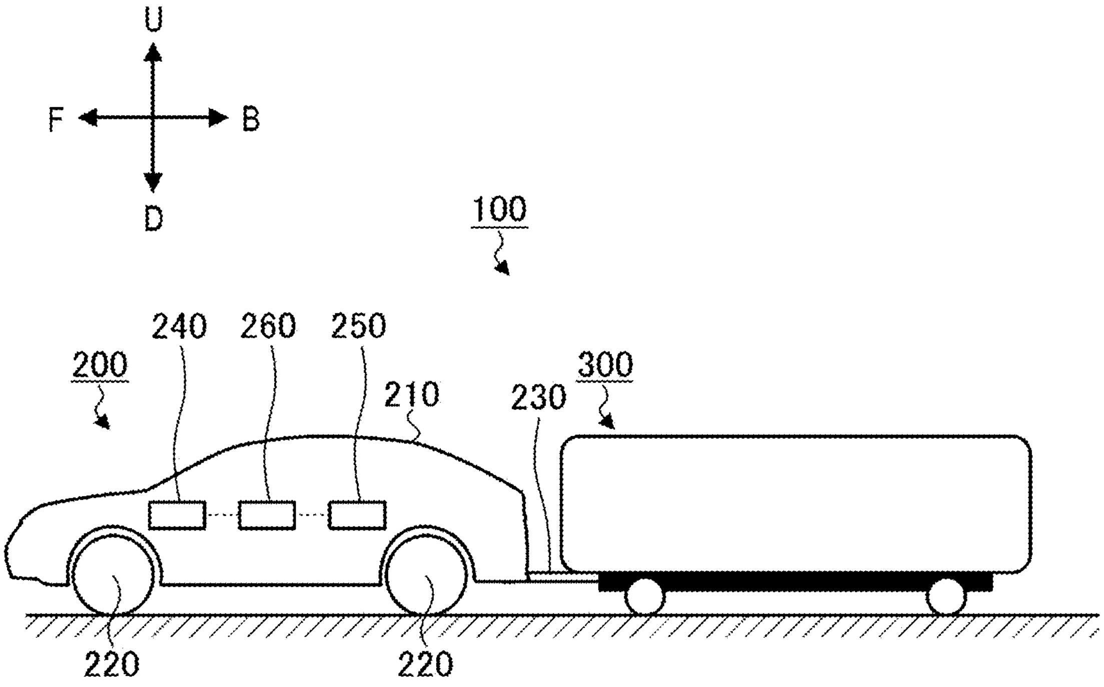
FIG. 1 is a side view illustrating a configuration of a vehicle system according to an embodiment.

FIG. 1 is a side view illustrating the configuration of a vehicle system 100 according to this embodiment. The vehicle system 100 includes a vehicle 200 and a towed object 300. In FIG. 1, up-down and front-rear directions with respect to the vehicle 200 are indicated by arrows. In FIG. 1, an arrow F indicates a front direction, in which the vehicle 200 moves forward, and an arrow B indicates a rear direction, in which the vehicle 200 moves backward. An arrow U indicates an up direction with respect to the vehicle 200, and an arrow D indicates a down direction with respect to the vehicle 200.

The vehicle 200 is a towing vehicle capable of towing the towed object 300. The vehicle 200 of this embodiment is an electric vehicle driven by a motor. However, the vehicle 200 is not limited to this, and may be an engine vehicle driven by an engine, or a hybrid vehicle driven by an engine and a motor. The vehicle 200 includes a vehicle body 210, wheels 220, a coupling device 230, a vibration generator 240, a sensor 250, and a controller 260.

The vehicle body 210 is equipped with the coupling device 230, the vibration generator 240, the sensor 250, and the controller 260. Four wheels 220 are provided below the vehicle body 210. The four wheels 220 include two front wheels and two rear wheels. A motor 242 described below provides the wheels 220 with a driving force. The driving force rotates the wheels 220, moving the vehicle 200 in the front direction F or the rear direction B.

The coupling device 230 is provided at the rear end of the vehicle body 210. The coupling device 230 couples the vehicle body 210 and the towed object 300. The towed object 300 is coupled to the vehicle body 210 via the coupling device 230. The towed object 300 coupled to the vehicle body 210 by the coupling device 230 can move with the vehicle 200 when the vehicle 200 moves.

Figure 2:
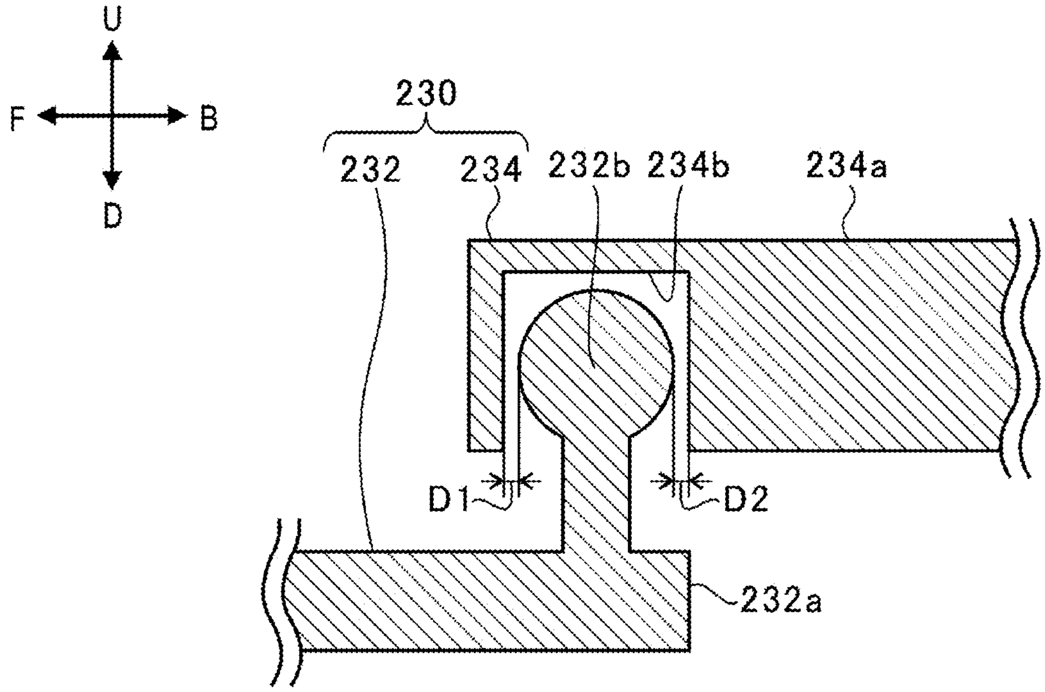
FIG. 2 is a sectional view illustrating an example coupling device according to the embodiment.

FIG. 2 is a sectional view illustrating an example of the coupling device 230 according to this embodiment. As illustrated in FIG. 2, the coupling device 230 includes a first coupling member 232 and a second coupling member 234. The first coupling member 232 is coupled to the vehicle body 210 of the vehicle 200, and the second coupling member 234 is coupled to the towed object 300.

The first coupling member 232 includes a main body **232*a* and a first coupling part 232*b*. The first coupling part 232*b* is a projection projecting in the up direction U from the upper surface of the main body 232*a*. In this embodiment, the upper end of the first coupling part 232*b* is spherical. However, the shape of the upper end of the first coupling part 232*b*** is not limited thereto, and may be another shape, such as a cubic shape, a rectangular parallelepiped shape, a prismatic shape, or a cylindrical shape.

The second coupling member 234 includes a main body **234*a* and a second coupling part 234*b*. The second coupling part 234*b* is a recess provided in the lower surface of the main body 234*a* so as to extend in the up direction U. In this embodiment, the recess, serving as the second coupling part 234*b*, has a cubic shape. However, the shape of the second coupling part 234*b*** is not limited thereto, and may be another shape, such as a rectangular parallelepiped shape, a prismatic shape, or a cylindrical shape.

By bringing the second coupling member 234 toward the first coupling member 232 from above, and allowing at least a part of the first coupling part **232*b* to enter the inside of the second coupling part 234*b*, the first coupling member 232 and the second coupling member 234 are coupled. By coupling the first coupling member 232 and the second coupling member 234, the vehicle 200 and the towed object 300 are made to be able to move together. Furthermore, by separating the second coupling member 234 from the upper side of the first coupling member 232, so that the first coupling part 232*b* is out of the second coupling part 234*b*, the first coupling member 232 and the second coupling member 234** are uncoupled.

In the coupled state, there are a first clearance D1 and a second clearance D2 between the first coupling part **232*b* and the second coupling part 234*b*. The first clearance D1 is a distance between the first coupling part 232*b* and the front-side portion of the second coupling part 234*b*. The second clearance D2 is a distance between the first coupling part 232*b* and the rear-side portion of the second coupling part 234*b*. Although not illustrated, clearances similar to the first clearance D1 and the second clearance D2, provided on the front and rear sides, are also provided between the first coupling part 232*b* and the second coupling part 234*b*** on the left and right sides.

If no clearance is provided between the first coupling part **232*b* and the second coupling part 234*b*, it may be impossible to allow the first coupling part 232*b* to enter the inside of the second coupling part 234*b* due to machining accuracy, manufacturing errors, or the like. By providing clearances between the first coupling part 232*b* and the second coupling part 234*b*, even if machining accuracy is low or there is a manufacturing error, it is possible to allow the first coupling part 232*b* to enter the inside of the second coupling part 234*b***.

Figure 3:
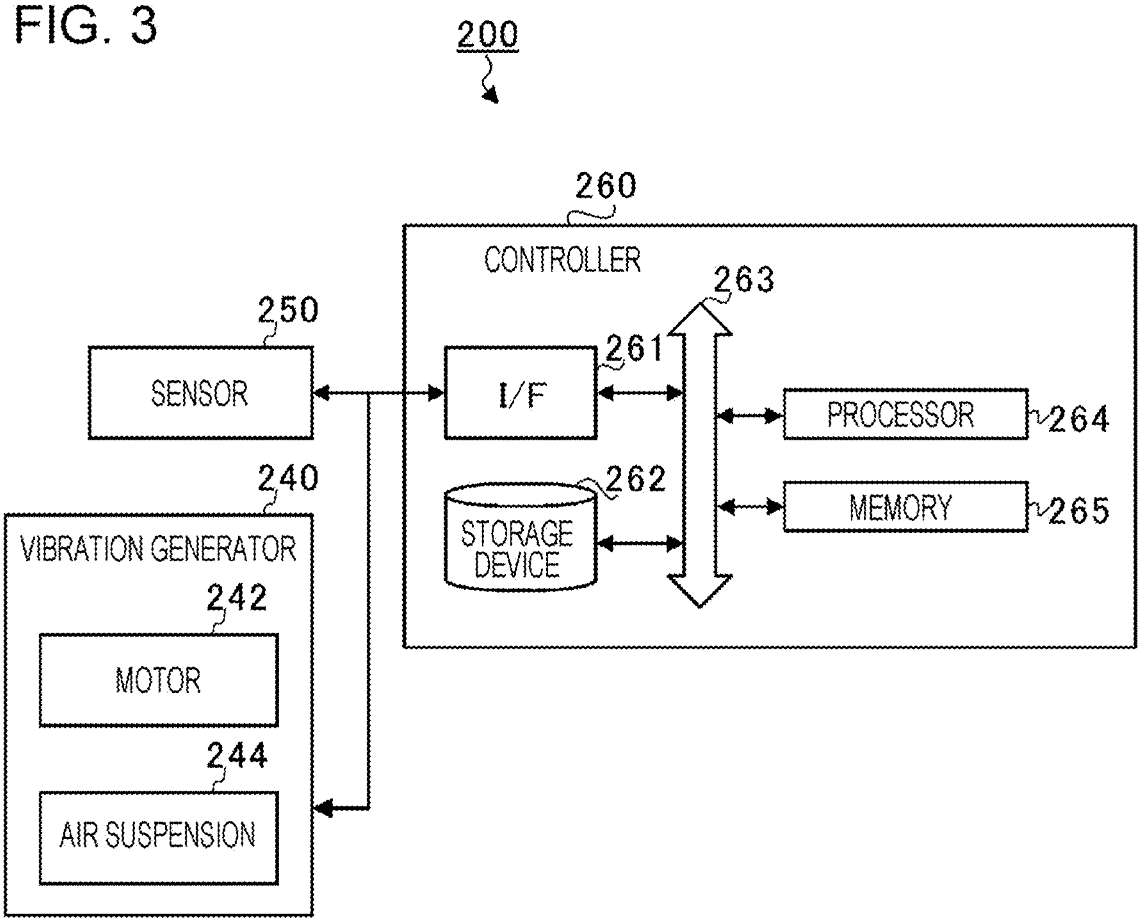
FIG. 3 is a block diagram illustrating the configuration of a vehicle according to the embodiment.

FIG. 3 is a block diagram illustrating the configuration of the vehicle 200 according to this embodiment. As illustrated in FIG. 3, the vibration generator 240 includes a motor 242 and an air suspension 244.

The motor 242 drives the wheels 220. In this embodiment, the wheels 220 are driven by the motor 242. However, the wheels 220 may be driven by an engine, or both the motor and the engine. The motor 242 is coupled to the wheels 220 via a power transmission device (not illustrated). However, the configuration is not limited thereto, and the motor 242 may be directly coupled to the wheels 220 without the power transmission device (not illustrated) therebetween. For example, the motor 242 may be provided for each of the four wheels 220. The magnitude of driving force transmitted from the motor 242 to the wheels 220 and the rotational direction thereof are controlled on the basis of a control command transmitted from the controller 260.

The air suspension 244 supports the vehicle body 210 with respect to axles (not illustrated) of the wheels 220 using air pressure, and also reduces and absorbs impact from a road surface, input from the axles to the vehicle body 210. An air pump (not illustrated) is coupled to the air suspension 244. The height of the vehicle body 210 with respect to the axles is adjusted by supplying air from the air pump and discharging the supplied air. The amount of air supplied from the air pump to the air suspension is controlled according to a control command transmitted from the controller 260. The amount of air discharged from the air suspension is controlled according to a control command transmitted from the controller 260.

The sensor 250 is an acceleration sensor that measures the acceleration of the vehicle 200. The sensor 250 can measure the acceleration in mutually orthogonal three axes, and measures the acceleration in the front-rear direction, the left-right direction, and the up-down direction of the vehicle 200, for example. The signal measured by the sensor 250 is transmitted to the controller 260.

The controller 260 controls the overall vehicle 200. The controller 260 includes an I/F 261, a storage device 262, a system bus 263, one or more processors 264, and one or more memories 265. The I/F 261 is an interface for communicating with the vibration generator 240 and the sensor 250. For example, the I/F 261 acquires data transmitted from the sensor 250. The I/F 261 also transmits a control signal to the vibration generator 240.

The storage device 262 includes a RAM, a flash memory, and an HDD and holds various kinds of information necessary for the processing performed by the processor 264, described below. The system bus 263 is a transmission path that electrically couples the I/F 261, the storage device 262, the processor 264, and the memory 265 to one another and that allows data to be transmitted among them.

The processor 264 includes, for example, a central processing unit (CPU). The memory 265 includes, for example, a read-only memory (ROM) and a random-access memory (RAM). The ROM is a storage element that stores programs, operation parameters, and the like used by the CPU. The RAM is a storage element that temporarily stores data such as variables and parameters used for processing executed by the CPU.

Figure 4:
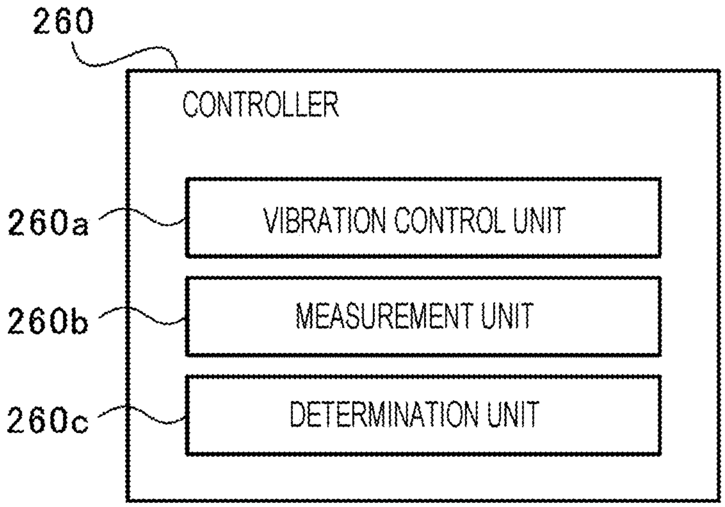
FIG. 4 is a block diagram illustrating an example functional configuration of a controller according to the embodiment.

FIG. 4 is a block diagram illustrating an example functional configuration of the controller 260 according to this embodiment. For example, as illustrated in FIG. 4, the controller 260 includes a vibration control unit 260*a*, a measurement unit 260*b*, and a determination unit 260*c*.

The processor 264 cooperates with the programs stored in the memory 265 and executes the programs stored in the memory 265 to realize various processes including the processes described below, performed by the vibration control unit 260*a*, the measurement unit 260*b*, and the determination unit 260*c*.

The vibration control unit 260*a* controls the vibration generator 240 to control the vibration generated by the vibration generator 240. In this embodiment, the vibration control unit 260*a* causes the vibration generator 240 to generate a first vibration having a first vibration characteristic set in advance, in a state in which the vehicle body 210 and the towed object 300 are coupled to each other by the coupling device 230.

The measurement unit 260*b* measures, using the sensor 250, a second vibration characteristic, which is a characteristic of a second vibration actually generated in the vehicle body 210 coupled to the towed object 300. The determination unit 260*c* compares the first vibration characteristic and the second vibration characteristic to determine the coupling state between the vehicle body 210 and the towed object 300. For example, the determination unit 260*c* determines the coupling state between the vehicle body 210 and the towed object 300 on the basis of the degree of correlation between the waveform of the first vibration characteristic and the waveform of the second vibration characteristic. The details of control of the vibration control unit 260*a*, the measurement unit 260*b*, and the determination unit 260*c* will be described below.

When the vehicle 200 and the towed object 300 are not appropriately coupled to each other by the coupling device 230, the vehicle 200 and the towed object 300 may be uncoupled while the vehicle 200 is towing the towed object 300. Hence, the driver who drives the vehicle 200 checks whether the vehicle 200 and the towed object 300 are appropriately coupled by the coupling device 230 visually or manually by rocking the coupling device 300. This checking task is troublesome for the driver, and it is not easy to determine whether the vehicle and the towed object are appropriately coupled.

In the vehicle 200 of this embodiment, the vibration generator 240 vibrates the vehicle body 210 with a preset reference vibration (first vibration), and the sensor 250 detects the actual vibration (second vibration) of the vehicle body 210. By comparing the vibration characteristic of the first vibration and the vibration characteristic of the second vibration, it is determined whether the vehicle 200 and the towed object 300 are appropriately coupled by the coupling device 230.

Figure 5:
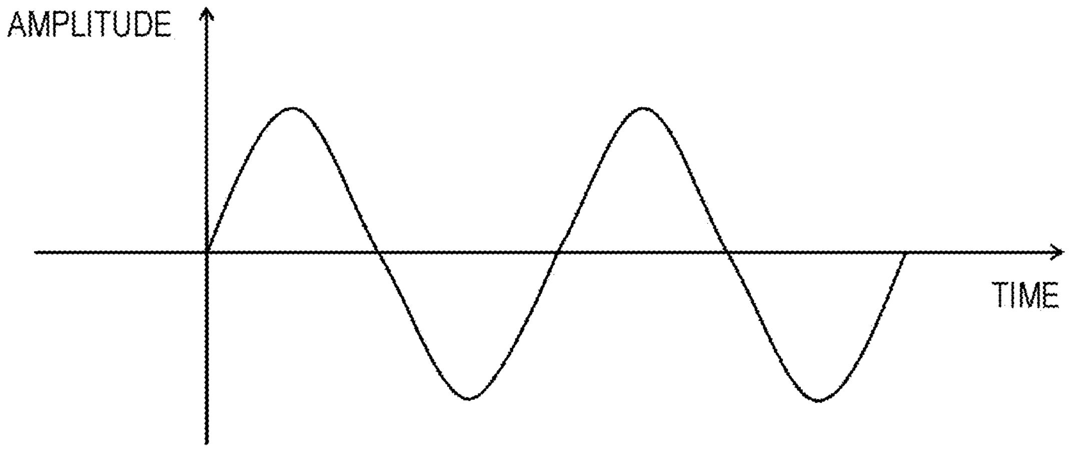
FIG. 5 is a graph illustrating an example of a first vibration characteristic.

FIG. 5 is a graph illustrating an example of the first vibration characteristic. The first vibration characteristic is the vibration characteristic of the first vibration. The first vibration is the reference vibration generated in the vehicle body 210 by the vibration generator 240. The vibration characteristic includes components such as frequency, amplitude, and waveform of the vibration. As illustrated in FIG. 5, the waveform of the first vibration is a sine wave having a constant period, and the first vibration characteristic is a sinusoidal characteristic having a constant frequency and a constant maximum amplitude. The storage device 262 stores information on the first vibration characteristic of the preset first vibration. The information regarding the first vibration characteristic includes at least information indicating a frequency component of the first vibration (for example, a frequency, a maximum amplitude, and the like set in advance as the reference vibration).

The vibration control unit 260*a* controls the vibration generator 240 such that the vibration generator 240 generates the first vibration having the first vibration characteristic as illustrated in FIG. 5, on the basis of the information on the first vibration characteristic stored in the storage device 262. For example, the vibration control unit 260*a* causes the motor 242 to repeatedly move the vehicle 200 forward and backward, thus rocking the vehicle body 210 in the front-rear direction to generate the first vibration having the first vibration characteristic. The first vibration is the reference vibration applied to the vehicle 200 to determine the coupling state described below and has a predetermined frequency and amplitude.

Figure 6:
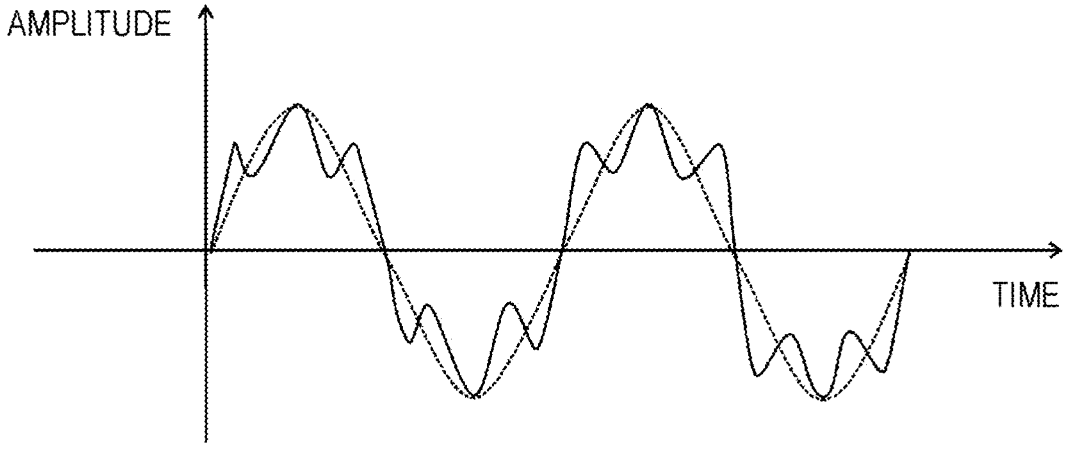
FIG. 6 is a graph illustrating an example of a second vibration characteristic.

FIG. 6 is a graph illustrating an example of the second vibration characteristic. The second vibration characteristic is the vibration characteristic of the second vibration. The second vibration is the vibration actually generated in the vehicle body 210 as a result of generating the first vibration in the vehicle body 210, and is the actual vibration measured by the sensor 250 provided in the vehicle body 210. In FIG. 6, a solid line indicates the second vibration characteristic of the second vibration, and a dotted line indicates the first vibration characteristic of the first vibration.

FIG. 6 illustrates the second vibration characteristic of the second vibration actually generated in the vehicle body 210, measured by the sensor 250, when the first vibration is generated by the vibration generator 240. The vibration control unit 260*a* generates the first vibration having the first vibration characteristic by rocking the vehicle body 210 in the front-rear direction, and the measurement unit 260*b* measures, using the sensor 250, the second vibration characteristic of the second vibration actually generated in the vehicle body 210 at this time. The solid line in FIG. 6 indicates the second vibration characteristic of the measured second vibration.

As illustrated in FIG. 2, there are the first clearance D1 and the second clearance D2 between the first coupling part 232*b* and the second coupling part 234*b* of the coupling device 230 in the front-rear direction. Hence, when the vehicle 200 moves forward, the towed object 300 does not move until the first clearance D1 reaches 0, and only the vehicle 200 moves in the front direction F. When the first clearance D1 reaches 0, and the first coupling part 232*b* and the second coupling part 234*b* come into contact with each other, the towed object 300 and the vehicle 200 move together in the front direction F.

Figure 7:
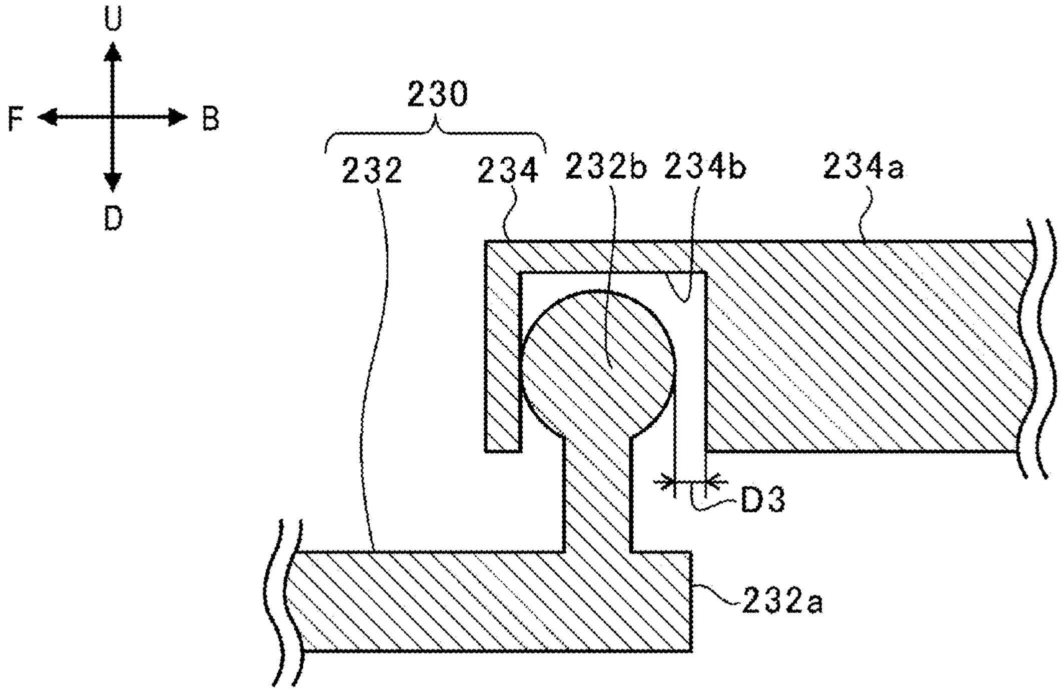
FIG. 7 is a sectional view illustrating the coupling device when a towed object and the vehicle are moving in a front direction together.

FIG. 7 is a sectional view illustrating the coupling device 230 when the towed object 300 and the vehicle 200 are moving together in the front direction F. As illustrated in FIG. 7, a third clearance D3 is formed between the first coupling part 232*b* and the rear-side portion of the second coupling part 234*b*. The third clearance D3 is substantially equal to the sum of the first clearance D1 and the second clearance D2.

When the vehicle 200 moves backward, the towed object 300 does not move, and only the vehicle 200 moves in the rear direction B until the third clearance D3 reaches 0. Then, when the third clearance D3 reaches 0, and the first coupling part 232*b* and the second coupling part 234*b* come into contact with each other, the towed object 300 and the vehicle 200 move together in the rear direction B.

Figure 8:
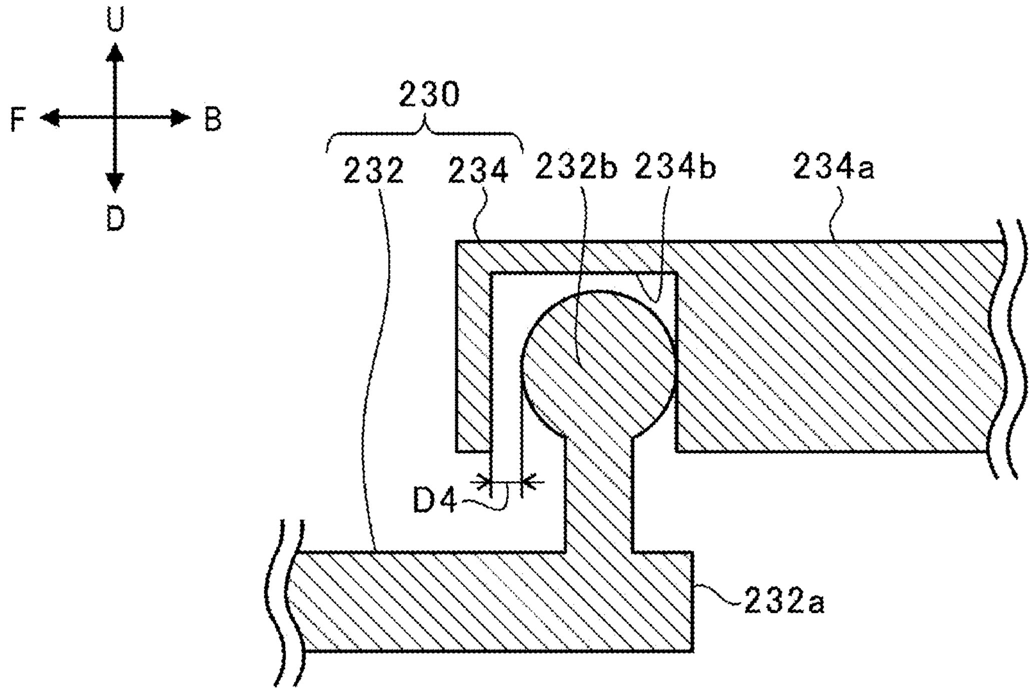
FIG. 8 is a sectional view illustrating the coupling device when the towed object and the vehicle are moving in a rear direction together.

FIG. 8 is a sectional view illustrating the coupling device 230 when the towed object 300 and the vehicle 200 are moving together in the rear direction B. As illustrated in FIG. 8, a fourth clearance D4 is formed between the first coupling part 232*b* and the front-side portion of the second coupling part 234*b*. The fourth clearance D4 is substantially equal to the sum of the first clearance D1 and the second clearance D2, and is also substantially equal to the third clearance D3.

When the vehicle 200 moves forward in the state illustrated in FIG. 8, the towed object 300 does not move, and only the vehicle 200 moves in the front direction F until the fourth clearance D4 reaches 0. When the fourth clearance D4 reaches 0, and the first coupling part 232*b* and the second coupling part 234*b* come into contact with each other, the towed object 300 and the vehicle 200 move together in the front direction F. Then, forward and backward movements of the vehicle 200 are repeated while the states of the coupling device 230 illustrated in FIGS. 7 and 8 are repeatedly alternated, so that the vehicle body 210 is rocked in the front-rear direction.

In this way, by generating, with the vibration generator 240, the first vibration having the first vibration characteristic in a state in which the vehicle body 210 and the towed object 300 are coupled by the coupling device 230, the first coupling part 232*b* and the second coupling part 234*b* of the coupling device 230 repeatedly collide with each other. This generates a vibration (third vibration) due to the collision between the first coupling part 232*b* and the second coupling part 234*b*. Hence, as illustrated in FIG. 6, the second vibration characteristic of the second vibration includes a third vibration characteristic of a third vibration caused by the collision between the first coupling part 232*b* and the second coupling part 234*b* in addition to the first vibration characteristic of the first vibration. Thus, as illustrated in FIG. 6, the second vibration has a waveform in which vibrations having different frequencies are combined.

Figure 9:
FIG. 9 is a graph illustrating a first frequency component, which is a frequency component of a first vibration.
Figure 10:
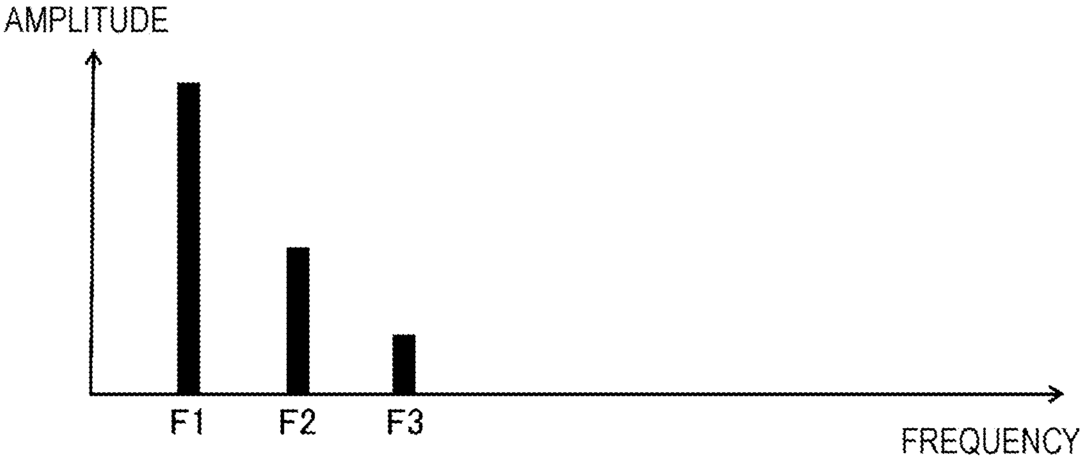
FIG. 10 is a graph illustrating a second frequency component, which is a frequency component of a second vibration.

FIG. 9 is a graph illustrating a first frequency component, which is a frequency component of the first vibration. FIG. 10 is a graph illustrating a second frequency component, which is a frequency component of the second vibration.

As illustrated in FIG. 9, the first frequency component corresponding to the first vibration includes a first frequency F1. As illustrated in FIG. 10, the second frequency component corresponding to the second vibration includes the first frequency F1, a second frequency F2, and a third frequency F3. The second and third frequencies F2 and F3 differ from the first frequency F1 and are higher than the first frequency F1. The third frequency F3 differs from the second frequency F2 and is higher than the second frequency F2. The amplitudes of the second and third frequencies F2 and F3 differ from the amplitude of the first frequency F1 and are smaller than the amplitude of the first frequency F1. The amplitude of the third frequency F3 differs from the amplitude of the second frequency F2 and is smaller than the amplitude of the second frequency F2.

The determination unit 260*c* decomposes the signal measured by the sensor 250 into frequency components by means of Fourier transform. As illustrated in FIG. 9, the first vibration characteristic of the first vibration includes the first frequency component having only the first frequency F1. As illustrated in FIG. 10, the second vibration characteristic of the second vibration includes the second frequency component having the first frequency component F1, the second frequency component F2, and the third frequency component F3.

The determination unit 260*c* compares the first frequency component of the first vibration characteristic and the second frequency component of the second vibration characteristic to determine the coupling state between the vehicle body 210 and the towed object 300. The determination unit 260*c* determines whether the second frequency component and the first frequency component match within a predetermined error range. What is meant by the "within a predetermined error range" is, for example, a case in which the proportion of the value of the frequency of the second frequency component in the value of the frequency of the first frequency component is in the range of 100% to 95% (for example, an error of ±5%).

When the second frequency component and the first frequency component match within a predetermined error range, the determination unit 260*c* determines that the vehicle body 210 and the towed object 300 are uncoupled. Meanwhile, when the second frequency component and the first frequency component do not match within the predetermined error range, the determination unit 260*c* determines whether the second frequency component includes another frequency component in addition to the first frequency component. When the second frequency component includes another frequency component in addition to the first frequency component, the determination unit 260*c* determines that the vehicle body 210 and the towed object 300 are appropriately coupled.

However, the configuration is not limited thereto, and the determination unit 260*c* may determine the coupling state between the vehicle body 210 and the towed object 300 on the basis of the degree of correlation between the waveform of the first vibration characteristic and the waveform of the second vibration characteristic. When the degree of correlation between the waveform of the first vibration characteristic and the waveform of the second vibration characteristic is high, it can be determined that it is highly likely that the first vibration generated by the vibration generator 240 is measured as the second vibration by the sensor 250. In other words, it can be determined that it is highly likely that only the vehicle body 210 is vibrating, and thus, the vehicle body 210 and the towed object 300 are uncoupled. When the degree of correlation between the waveform of the first vibration characteristic and the waveform of the second vibration characteristic is low, because the first vibration generated by the vibration generator 240 has changed to the second vibration, it can be determined that it is a highly likely that the vehicle body 210 is vibrating with another object. Hence, it can be determined that the vehicle body 210 and the towed object 300 are appropriately coupled.

Figure 11:
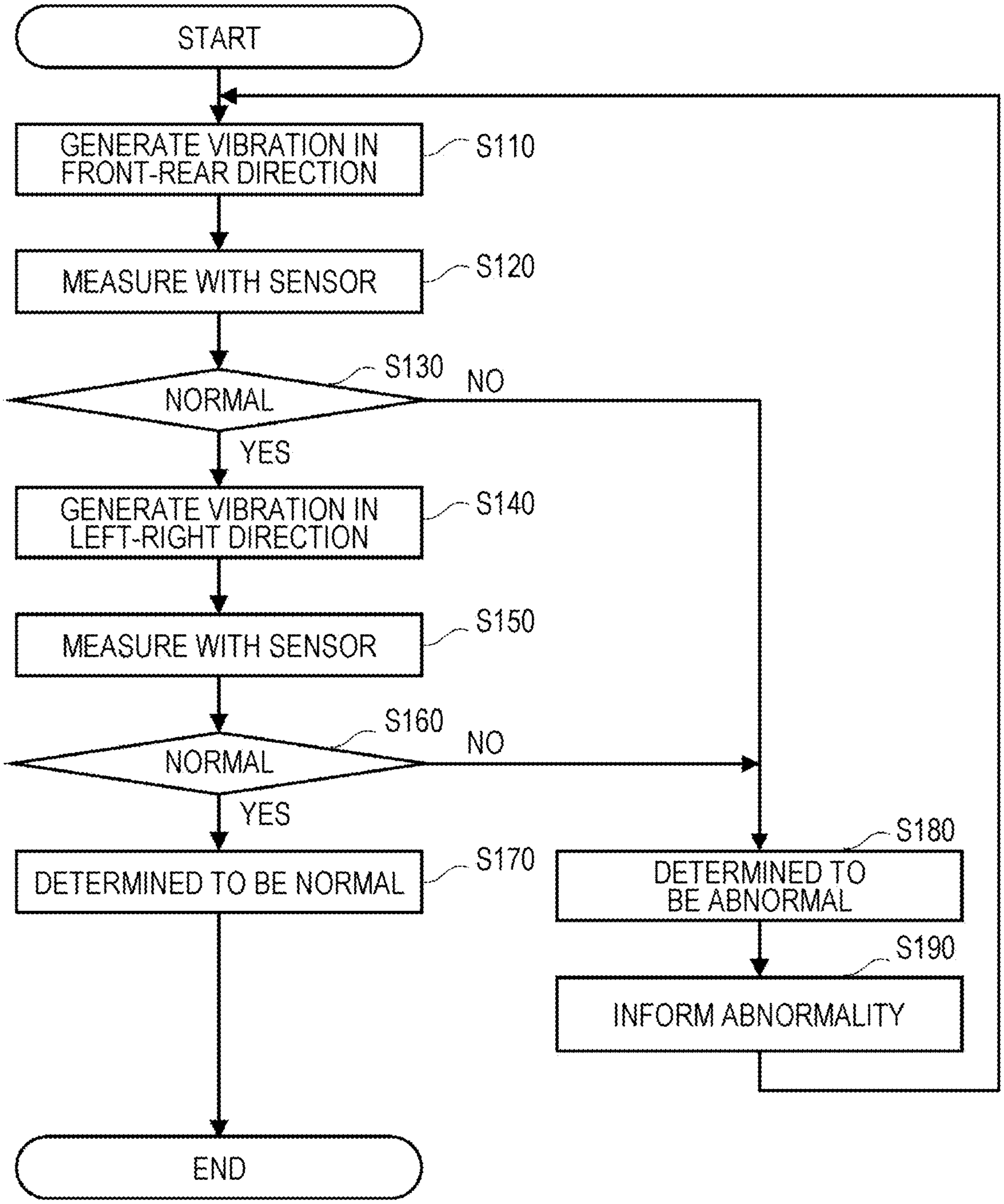
FIG. 11 is a flowchart illustrating a determination process, performed by a determination unit according to the embodiment, for determining the coupling state between the vehicle body and the towed object.

FIG. 11 is a flowchart illustrating a determination process of determining the coupling state between the vehicle body 210 and the towed object 300, performed by the determination unit 260*c* according to this embodiment. Before the determination unit 260*c* performs the determination process, the vehicle body 210 and the towed object 300 are coupled to each other by the coupling device 230.

As illustrated in FIG. 11, the vibration control unit 260*a* causes the motor 242 to repeatedly move the vehicle 200 forward and backward quickly at a high frequency to generate the first vibration having the first vibration characteristic and rock the vehicle body 210 in the front-rear direction (S110).

The measurement unit 260*b* measures, using the sensor 250, the second vibration characteristic of the second vibration actually generated in the vehicle body 210 coupled to the towed object 300, as a result of step S110 (S120). Once the measurement unit 260*b* has finished measuring, the vibration control unit 260*a* stops driving of the motor 242 to stop the first vibration that rocks the vehicle body 210 in the front-rear direction.

The determination unit 260*c* compares the first vibration characteristic of the first vibration generated in step S110 and the second vibration characteristic of the second vibration measured in step S120 to determine whether the vehicle body 210 and the towed object 300 are appropriately coupled in the front-rear direction (S130). That is, the determination unit 260*c* determines whether the vehicle body 210 and the towed object 300 are appropriately coupled in the front-rear direction.

For example, when the second frequency component of the second vibration characteristic and the first frequency component of the first vibration characteristic match within a predetermined error range, the determination unit 260*c* determines that the vehicle body 210 and the towed object 300 are not appropriately coupled in the front-rear direction. Meanwhile, when the second frequency component includes another frequency component in addition to the first frequency component, it is determined that the vehicle body 210 and the towed object 300 are appropriately coupled in the front-rear direction.

When it is determined that the coupling in the front-rear direction is normal (YES in S130), the vibration control unit 260*a* uses the air suspension 244 to generate a fourth vibration having a fourth vibration characteristic to rock the vehicle body 210 in the left-right direction (S140). For example, the vibration control unit 260*a* uses the air suspension 244 to perform control such that one of the left and right sides of the vehicle body 210 is raised and the other is lowered, and then the one is lowered and the other is raised. By repeating this control, in which the left and right sides of the vehicle body 210 are alternately raised and lowered, the vibration control unit 260*a* generates the fourth vibration having the fourth vibration characteristic, which rocks the vehicle body 210 in the left-right direction.

The measurement unit 260*b* measures, using the sensor 250, a fifth vibration characteristic of a fifth vibration actually generated in the vehicle body 210 coupled to the towed object 300, as a result of step S140 (S150). Once the measurement unit 260*b* has finished measuring, the vibration control unit 260*a* stops driving of the air suspension 244 to stop the fourth vibration that rocks the vehicle body 210 in the left-right direction.

The determination unit 260*c* compares the fourth vibration characteristic of the fourth vibration generated in step S140 and the fifth vibration characteristic of the fifth vibration measured in step S150 to determine whether the vehicle body 210 and the towed object 300 are appropriately coupled in the left-right direction (S160). The determination in step S160 is similar to that in S130, so, detailed description thereof will be omitted.

When it is determined that coupling in the left-right direction is normal (YES in S160), the determination unit 260*c* determines that the vehicle body 210 and the towed object 300 are appropriately coupled in the front-rear direction and the left-right direction of the vehicle 200 and that the coupling is appropriately performed (S170).

Meanwhile, when it is determined that the coupling is not normal in step S130 or S160 (NO in S130, NO in S160), the determination unit 260*c* determines that the vehicle body 210 and the towed object 300 are uncoupled and that the coupling is abnormal (S180). Then, the determination unit 260*c* informs the driver that the vehicle body 210 and the towed object 300 are uncoupled and that the coupling is abnormal via a display (not illustrated) mounted in the vehicle 200 (S190). Alternatively, the determination unit 260*c* may inform the driver that the vehicle body 210 and the towed object 300 are uncoupled and that the coupling is abnormal via a speaker (not illustrated) mounted in the vehicle 200.

As described above, the controller 260 according to this embodiment includes the vibration control unit 260*a*, the measurement unit 260*b*, and the determination unit 260*c*. The vibration control unit 260*a* causes the vibration generator 240 to generate the first vibration having the first vibration characteristic set in advance, in a state in which the vehicle body 210 and the towed object 300 are coupled to each other by the coupling device 230. The measurement unit 260*b* measures, using the sensor 250, the second vibration characteristic, which is the characteristic of the second vibration actually generated in the vehicle body 210 coupled to the towed object 300. The determination unit 260*c* compares the first vibration characteristic and the second vibration characteristic to determine the coupling state between the vehicle body 210 and the towed object 300. With this configuration, the driver can easily determine whether the vehicle 200 and the towed object 300 are appropriately coupled to each other by the coupling device 230, without visually or manually checking the coupling state between the vehicle 200 and the towed object 300.

The vibration generator 240 includes the motor 242, and the vibration control unit 260*a* generates the first vibration that rocks the vehicle body 210 in the front-rear direction by repeating forward and backward movements of the vehicle 200 using the motor. The vibration control unit 260*a* causes the motor 242 to repeatedly move the vehicle 200 forward and backward quickly at a high frequency, thereby rocking the vehicle body 210 in the front-rear direction to generate the first vibration. This makes it possible to rock the vehicle body 210 in the front-rear direction at a higher frequency band than the case where the vehicle body 210 is rocked in the front-rear direction by using the engine and changing the gear for forward and backward movements. Thus, it is possible to determine the coupling state between the vehicle body 210 and the towed object 300 with higher accuracy.

The determination unit 260*c* determines the coupling state between the vehicle body 210 and the towed object 300 on the basis of the degree of correlation between the waveform of the first vibration characteristic and the waveform of the second vibration characteristic. When the degree of correlation between the waveform of the first vibration characteristic and the waveform of the second vibration characteristic is high, it can be determined that it is highly likely that only the vehicle body 210 is vibrating, and thus, the vehicle body 210 and the towed object 300 are uncoupled. When the degree of correlation between the waveform of the first vibration characteristic and the waveform of the second vibration characteristic is low, it can be determined that it is highly likely that the vehicle body 210 is vibrating with another object, and thus, the vehicle body 210 and the towed object 300 are appropriately coupled.

The first vibration characteristic includes the first frequency component, which is a frequency component of the first vibration, and the second vibration characteristic includes the second frequency component, which is a frequency component of the second vibration. When the second frequency component and the first frequency component match within a predetermined error range, the determination unit 260*c* determines that the vehicle body 210 and the towed object 300 are uncoupled. When the second frequency component and the first frequency component match within a predetermined error range, that is, when they are close to each other, it can be determined that it is highly likely that only the vehicle body 210 is vibrating, and it can be determined that the vehicle body 210 and the towed object 300 are uncoupled.

When the second frequency component includes another frequency component in addition to the first frequency component, the determination unit 260*c* determines that the vehicle body 210 and the towed object 300 are coupled to each other. When the second frequency component includes another frequency component in addition to the first frequency component, it is considered that collision between the first coupling part 232*b* and the second coupling part 234*b* is repeatedly occurring in the coupling device 230. This collision does not occur when the vehicle body 210 and the towed object 300 are not coupled by the coupling device 230. Hence, when the second frequency component includes another frequency component in addition to the first frequency component, it can be determined that the vehicle body 210 and the towed object 300 are appropriately coupled.

Although the embodiment of the disclosure has been described above with reference to the accompanying drawings, the disclosure is of course not limited to this embodiment. It is apparent that those skilled in the art can conceive various modifications or alterations within the scope described in the claims, and it is understood that they of course belong to the technical scope of the disclosure.

In the above embodiment, the example in which the vibration generator 240 generates vibrations in the front-rear direction and the left-right direction of the vehicle 200 has been described. However, the configuration is not limited thereto, and the vibration generator 240 may generate a vibration only in the front-rear direction or the left-right direction of the vehicle 200. That is, the vibration generator 240 may generate a vibration only in the front-rear direction of the vehicle 200, or may generate a vibration only in the left-right direction of the vehicle 200.

According to the disclosure, it is possible to easily determine whether the vehicle and the towed object are appropriately coupled by the coupling device.

The invention claimed is:

1. A vehicle comprising:

a vehicle body;

a coupling device configured to couple a towed object and the vehicle body to each other;

a vibration generator provided on the vehicle body and configured to vibrate the vehicle body;

a sensor provided on the vehicle body and configured to measure the vibration of the vehicle body; and a controller configured to control the vibration generator, wherein the controller includes one or more processors and one or more memories coupled to the one or more processors, and the one or more processors are configured to execute processing including:

causing the vibration generator to generate a first vibration having a first vibration characteristic set in advance, in a state in which the vehicle body and the towed object are coupled to each other by the coupling device;

measuring, using the sensor, a second vibration characteristic that is a characteristic of a second vibration actually generated in the vehicle body coupled to the towed object; and comparing the first vibration characteristic and the second vibration characteristic to determine a coupling state between the vehicle body and the towed object.

2. The vehicle according to claim 1, wherein the vibration generator includes a motor that drives the vehicle, and the one or more processors are configured to cause the motor to repeatedly move the vehicle forward and backward to generate the first vibration that rocks the vehicle body in the front-rear direction.

3. The vehicle according to claim 1, wherein the one or more processors are configured to determine the coupling state between the vehicle body and the towed object based on a degree of correlation between a waveform of the first vibration characteristic and a waveform of the second vibration characteristic.

4. The vehicle according to claim 2, wherein the one or more processors are configured to determine the coupling state between the vehicle body and the towed object based on a degree of correlation between a waveform of the first vibration characteristic and a waveform of the second vibration characteristic.

5. The vehicle according to claim 3, wherein the first vibration characteristic includes a first frequency component that is a frequency component of the first vibration, the second vibration characteristic includes a second frequency component that is a frequency component of the second vibration, and the one or more processors are configured to determine that the vehicle body and the towed object are uncoupled when the second frequency component and the first frequency component match within a predetermined error range.

6. The vehicle according to claim 4, wherein the first vibration characteristic includes a first frequency component that is a frequency component of the first vibration, the second vibration characteristic includes a second frequency component that is a frequency component of the second vibration, and the one or more processors are configured to determine that the vehicle body and the towed object are uncoupled when the second frequency component and the first frequency component match within a predetermined error range.

7. The vehicle according to claim 3, wherein the first vibration characteristic includes a first frequency component that is a frequency component of the first vibration, the second vibration characteristic includes a second frequency component that is a frequency component of the second vibration, and the one or more processors are configured to determine that the vehicle body and the towed object are coupled to each other when the second frequency component includes another frequency component in addition to the first frequency component.

8. The vehicle according to claim 4, wherein the first vibration characteristic includes a first frequency component that is a frequency component of the first vibration, the second vibration characteristic includes a second frequency component that is a frequency component of the second vibration, and the one or more processors are configured to determine that the vehicle body and the towed object are coupled to each other when the second frequency component includes another frequency component in addition to the first frequency component.

* * * * *